US006925436B1

United States Patent
Franz et al.

(10) Patent No.: US 6,925,436 B1
(45) Date of Patent: Aug. 2, 2005

(54) INDEXING WITH TRANSLATION MODEL FOR FEATURE REGULARIZATION

(75) Inventors: Martin Franz, Yorktown Heights, NY (US); Jeffrey Scott McCarley, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,507

(22) Filed: Jan. 28, 2000

(51) Int. Cl.[7] .............................................. G10L 15/26
(52) U.S. Cl. ...................... 704/235; 704/246; 707/102
(58) Field of Search ............................. 707/102; 704/10, 704/200, 203, 231, 235, 246, 243, 251, 277, 278

(56) References Cited

U.S. PATENT DOCUMENTS

| | | | | |
|---|---|---|---|---|
| 5,153,831 A | * | 10/1992 | Yianilos | 707/531 |
| 5,276,616 A | * | 1/1994 | Kuga et al. | 704/10 |
| 5,649,060 A | * | 7/1997 | Ellozy et al. | 704/278 |
| 5,909,667 A | * | 6/1999 | Leontiades et al. | 704/275 |
| 5,960,447 A | * | 9/1999 | Holt et al. | 704/235 |
| 6,021,409 A | * | 2/2000 | Burrows | 707/102 |
| 6,064,957 A | * | 5/2000 | Brandoww et al. | 704/235 |
| 6,076,059 A | * | 6/2000 | Glickman et al. | 704/260 |
| 6,101,467 A | * | 8/2000 | Bartosik | 704/235 |
| 6,172,675 B1 | * | 1/2001 | Ahmad et al. | 345/328 |
| 6,185,527 B1 | * | 2/2001 | Petkovic et al. | 704/231 |
| 6,243,676 B1 | * | 6/2001 | Witteman | 704/243 |
| 6,260,011 B1 | * | 7/2001 | Heckerman et al. | 704/235 |
| 6,292,771 B1 | * | 9/2001 | Haug et al. | 704/9 |
| 6,345,253 B1 | * | 2/2002 | Viswanthan | 704/272 |
| 6,434,520 B1 | * | 8/2002 | Kanevsky et al. | 704/243 |

OTHER PUBLICATIONS

J. Fiscus et al., "NIST's 1998 Topic Detection and Tracking Evaluation (TDT2)", DARPA Broadcast News Worshop Proceedings, Mar. 1999, pp. 19–24.
S. Dharanipragada et al., "Story Segmentation and Topic Detection in the Broadcast News Domain", DARPA Broadcast News Workshop Proceedings, Mar. 1999, pp. 65–68.
J. Garofolo et al., "Overview of the Spoken Document Retrieval Track", Proceedings of the Eighth Text Retrevial Conference, Nov. 1999.
J.S. McCarley et al., "Fast Document Translation for Cross–Language Information Retrieval", Machine Translation and the Information Soup, 1998, pp. 150–157.
E.K. Ringger et al., "A Fertility Channel Model for Post–Correction of Continuous Speech Recognition", ICSLP, 1996, pp. 897–900.
E.K. Ringger et al., "Error Correction Via a Post–Processor for Continuous Speech Recognition".

* cited by examiner

*Primary Examiner*—Daniel Abebe
(74) *Attorney, Agent, or Firm*—Ference & Associates

(57) ABSTRACT

An audio indexing system including, in addition to a speech recognition subsystem for converting the audio information into a textual form and an indexing subsystem for extracting the features to be used for searching and browsing, a statistical machine translation model, trained on a parallel or comparable corpus of automatically and by-hand transcribed data, for processing the output of the speech recognition system.

19 Claims, 2 Drawing Sheets

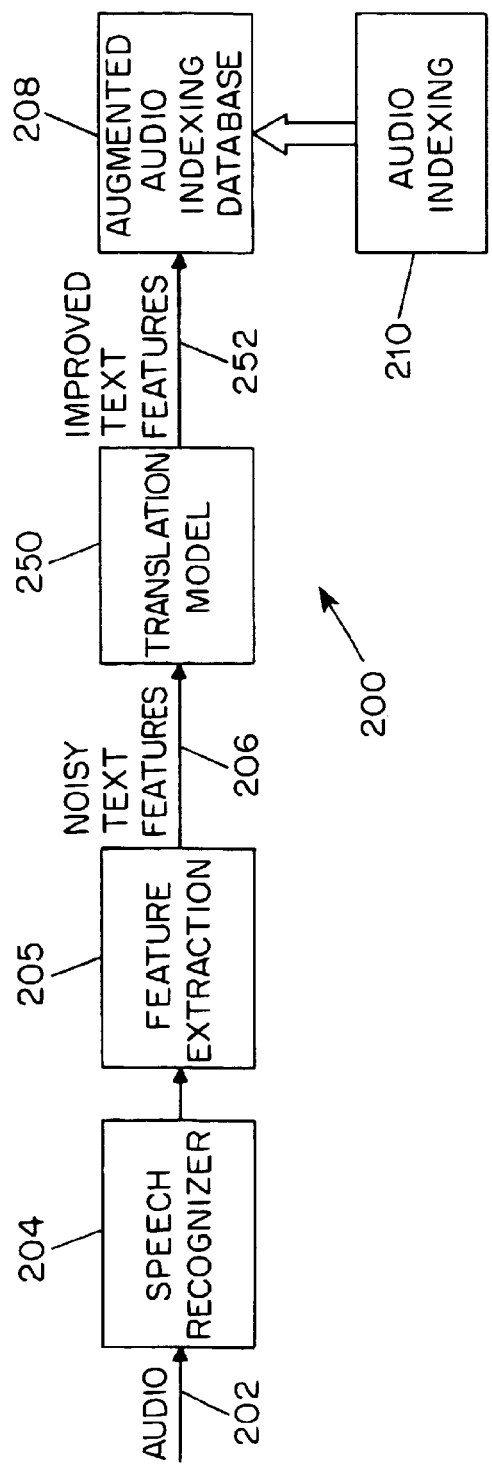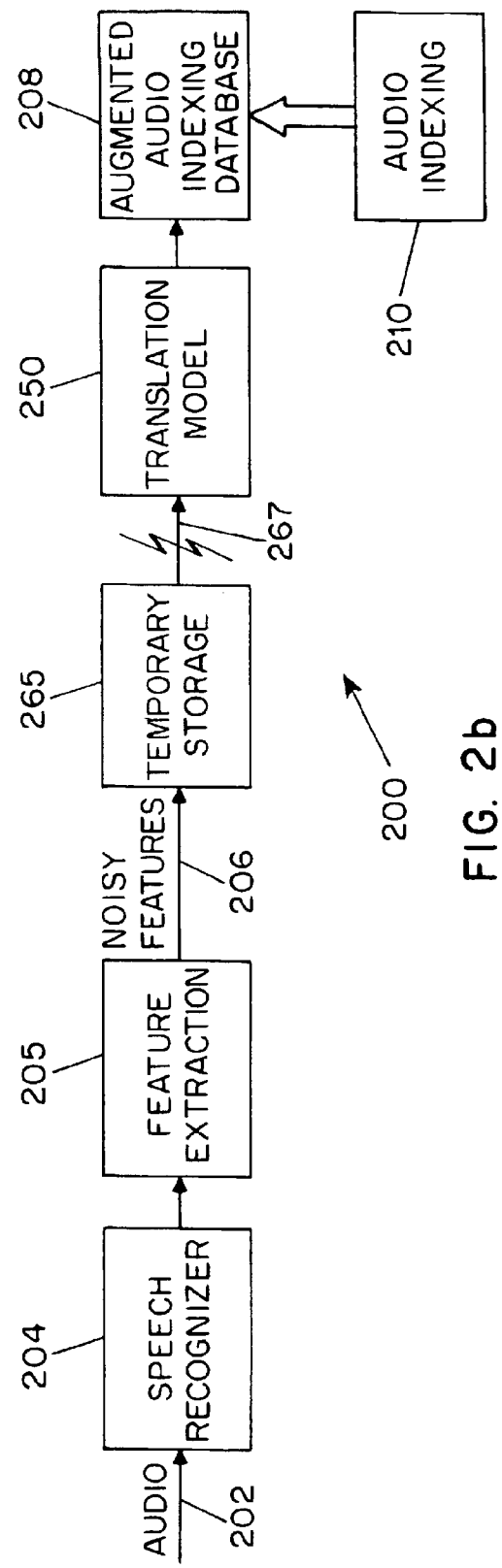

INDEXING WITH TRANSLATION MODEL FOR FEATURE REGULARIZATION

FIELD OF THE INVENTION

The present invention generally relates to indexing systems and, in particular, to arrangements for inputting data into an indexing database.

BACKGROUND OF THE INVENTION

An audio indexing system normally includes a speech recognition subsystem, converting the audio information into a textual form, and an indexing subsystem, which extracts the features to be used for searching and browsing. Thus, in conventional automatic audio indexing arrangements, an example of which (100) is schematically illustrated in FIG. 1, the input audio speech signal (102) is processed by a speech recognizer (104) to convert it into a raw textual form that may proceed to some type of feature extraction arrangement (105) that, for example, resolves the raw text output from the speech recognizer into "morphs" or "stems" (see infra). The resulting text (106) is then stored in an audio indexing database (108), in which it can be accessed by an audio indexing subsystem (110), providing retrieval, summarization and other indexing functions. The feature extracting function could also be performed within the speech recognizer (104) itself, thus obviating the need for a separate arrangement (105) for performing that function or, alternatively, feature extraction may be lacking altogether, in which case the words that are recognized by the speech recognizer (104) are transferred in their original form (without "morphing", "stemming" or the like) directly to the audio indexing database (108). A general discussion of audio indexing systems is provided in J. S. Garofolo, E. M. Voorhes, V. M. Stanford, "TREC-6 1997 Spoken Document Retrieval Track Overview and Results", in E. M. Voorhes, D. K. Harman, editors, The Proceedings of the Sixth Text Retrieval Conference, NIST Special Publication 500-240, pp 98–91, and M. Vishwanathan, H. S. M. Beigi, S. Dharanipragada, A. Tritchler, "Retrieval from Spoken Documents Using Context and Speaker Information", in The Proceedings of International Conference on Document Analysis and Retrieval, (ICDAR 99), Bangalore, India, 1999, pp 567–572.

One of the weak points of the approach described above is that the text data, created by the speech recognizer and/or feature extraction arrangement, typically contains numerous errors (e.g., word insertions, deletions and substitutions), caused by the noisy character of the incoming audio and inherent imperfections of the speech recognition and/or feature recognition systems. Such errors are necessarily reflected in the resulting audio indexing database and cause problems when the database is searched.

A need, therefore, has been recognized in conjunction with providing an audio indexing system that mitigates the above-described errors.

The papers "A Fertility Channel Model for Post-correction of Continuous Speech Recognition" (James Allen et al., International Conference for Speech and Language Processing, 1996) and "Error Correction via a Post-processor for Continuous Speech Recognition" (Erick K. Ringger and James F. Allen, Proceedings of the IEEE International Conference on Acoustic, Speech, and Signal Processing, 1996) describe the use of a statistically trained translation model in an air travel (ATIS) dialog/natural language understanding system. The statistical translation model was trained to translate from speech recognition output to hand-corrected (clean) text.

A primary objective of Allen et al., in particular, was to reduce the word-error-rate, and hence improve the readability of the speech recognizer output. However, no provision was made for directly improving the audio indexing effectiveness, as measured through standard information retrieval metrics such as average precision. Also, the system disclosed in Allen et al. was forced to operate in real-time, which restricted its capabilities.

Thus, a need has also been recognized in conjunction with providing an audio indexing system that improves upon the shortcomings of previous efforts in the field, including those discussed above.

SUMMARY OF THE INVENTION

The present invention broadly contemplates a system and method that is based on an application of a statistical translation model (trained from a parallel or comparable corpus) to feature regularization for audio indexing. The statistical machine translation model improves the quality of text features used to create the audio indexing database. The text data, created by a speech recognizer and/or feature extraction arrangement, is processed by the statistical translation model, trained on a parallel sets of automatically and by-hand transcribed data.

In one aspect, the present invention provides an indexing system having a recognizer, an indexing database, and a translator. The recognizer recognizes words. The translator accepts textual input from the recognizer and reconfigures the textual input for entry into the indexing database. Immediately prior to reconfiguration, the textual input appears as a feature-extracted transformation of at least one word recognized by the recognizer.

In another aspect, the present invention provides an method of indexing, in which an indexing database, recognizer and translator are provided. The recognizer recognizes words. The translator accepts textual input from the recognizer and reconfigures the textual input for entry into the indexing database. Immediately prior to reconfiguration, the textual input appears as a feature-extracted transformation of at least one word recognized by the recognizer.

Furthermore, the present invention may be implemented on a general-purpose computer running suitable software programs, and may also be implemented on an Integrated Circuit or part of an Integrated Circuit. Thus, it is to be understood that the invention may be implemented in hardware, software, or a combination of both. Thus, in another aspect, the present invention contemplates a program storage device readable by machine, tangibly embodying a program of instructions executable by the machine to perform method steps for providing indexing.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2a is a schematic illustration of an audio indexing system according to an embodiment of the present invention, in which a statistical translation model is included;

FIG. 2*b* is a variation on the embodiment shown in FIG. 2*a*, whereby temporary storage of text features is employed.

DESCRIPTION OF THE PREFERRED EMBODIMENTS

Figure 1:
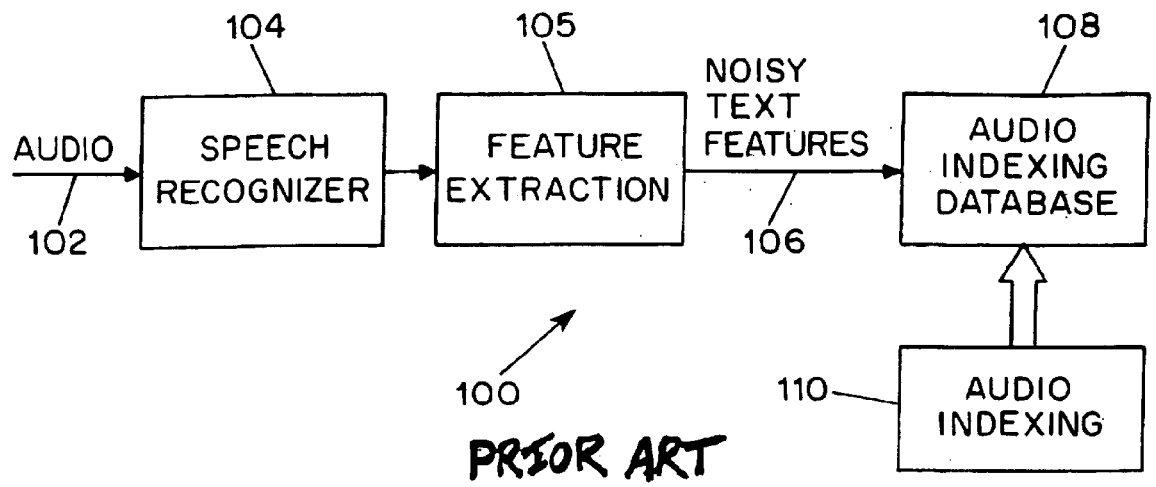
FIG. 1 is a schematic illustration of a conventional audio indexing system.

As illustrated in FIG. 2*a*, an audio indexing system 200, configured in accordance with a preferred embodiment of the present invention, may, as is known conventionally, provide for the inputting of an audio input 202 into a speech recognizer 204 that provides output for a feature extraction arrangement 205. The latter may then resolve the input from the speech recognizer 205 into simplified word forms such as "morphs", "stems" or the like (see infra), which are then issued as raw output (or "noisy text features") 206. An audio indexing database 208 is the ultimate destination of the text features 206, where they may be accessed by a typical audio indexing subsystem 210 that may, for example, provide retrieval, summarization and other indexing functions (e.g., to extract features to be used for searching and browsing). However, in contrast to conventional arrangements, the noisy text output 206 is preferably input into a statistical translation model 250 that "cleans up" or otherwise improves the raw output 206 and by transforming the same into an improved output 252 of text features for being stored in database 208. As alternatives to the arrangement just described, the function of "feature extraction" (i.e., of resolving words into features such as "morphs", "stems" or the like) could be performed within either the speech recognizer 204 or translation model 250, thus obviating the need for a distinct feature extraction arrangement 205.

FIG. 2*b* illustrates a variation on the arrangement shown in FIG. 2*a*. Particularly, FIG. 2*b* illustrates the option of providing temporary storage 265 for the raw output 206, rather than providing the output 206 directly to translation model 265. In this manner, the translation of the noisy features (to be described in more detail below) can optionally be delayed for a desired period of time before relaying the raw output to translation model 250. Thus, link 267 in the process is the delayed provision of the raw output 206. In this manner, a constant need for real-time processing is obviated.

It will be appreciated, from the arrangements illustrated in FIGS. 2*a* and 2*b*, that the statistical machine translation model (250) serves to improve the quality of text features used to create the audio indexing database. The output of the speech recognition system 204 and/or feature extraction arrangement 205 is processed by the translation model 250. The translated text (252), then, tends to contain a smaller number of the types of errors that are detrimental to audio indexing performance than the raw output 206. The audio indexing database 208 is thus constructed on the basis of the translation model output 252. The textual features of the augmented audio indexing database 208 thus become cleaner and the performance of the audio indexing is improved as compared to databases that rely on raw speech recognizer output.

Figure 3:
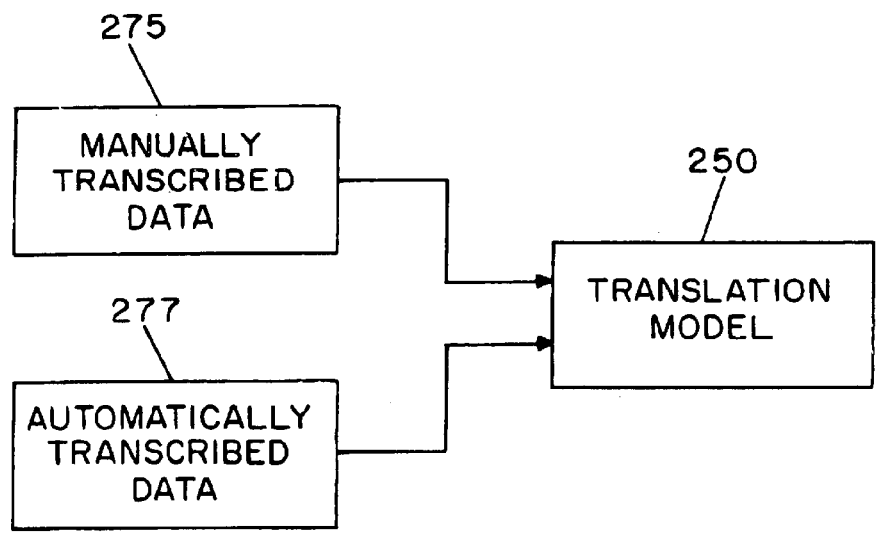
FIG. 3 is a schematic illustration of an arrangement for training a statistical training model in accordance with an embodiment of the present invention.

FIG. 3 illustrates, in schematic form, a translation model 250 that is trained on a parallel sets of automatically (275) and by-hand (277) transcribed data. Preferably, the translation model 250 is trained to translate from the language of automatically transcribed data 277 into the language of hand-transcribed data 275. The training process is preferably carried out automatically, without applying human knowledge about the source and target languages. It will be appreciated that it requires only the existence of a corpus of machine-transcribed and hand-transcribed data from a domain similar to the one to which the resulting translation model is to be applied. Essentially any suitable translation model 250 may be utilized in accordance with the embodiments of the present invention. One example of a translation model found to produce highly favorable results is discussed further below (i.e., the McCarley et al. documents).

The disclosure now continues with collective reference to all of FIGS. 2*a*, 2*b* and 3. Preferably, a feature extraction arrangement 205 employed in conjunction with the embodiments of the present invention will provide output 206 in the form of morphs, that is, morphological roots, or the base grammatical form of a word. For example, if the input 202 is " . . . nobody else is involved . . . " then the raw output 206 (assuming it is clean) may be " . . . nobody else be involve . . . ". As another example, " . . . he thought . . . " might result in " . . . he think . . . ". Such morphs, that are preferably "cleaned up" by translation model 250 and that will enter database 208 as improved text features 252, are well-suited for a typical audio indexing system 210 since such systems tend to use morphs as features for scoring documents. Examples of "cleaned-up" text features 252 might be as follows: translation model 250 might reconfigure the term "a rock" into "Iraq" or "Monica whiskey" into "Monica Lewinsky".

However, within the scope of at least one embodiment of the present invention, feature extraction need not necessarily be limited to the transformation of words into morphs but instead into other types of features. As an alternative, feature extraction could involve the transformation of words into stems, a somewhat simpler operation than transforming into morphs. For example, the words "running" and "run" would all be transformed into "run" regardless of whether the intended objective is to produce stems or morphs. However, the word "ran" would be realized as "ran" if a stem is produced but "run" if a morph is produced. Thus, a "stem" may be thought of as the inherent physical base form of a word (e.g. "cat" as a stem for "cats" but "geese" as a stem for "geese"), while a "morph" may be thought of as a the inherent grammatical base form of a word (e.g. "goose" as a morph for "geese", "do" as a morph for "did"). Other types of transformations are contemplated in accordance with at least one embodiment of the present invention, and it is to be understood that the present invention, in accordance with at least one embodiment, is not to be construed as being limited solely to morphing or stemming in connection with the function of feature extraction.

As discussed heretofore, the functions carried out by feature extraction arrangement 205 could alternatively be carried out by either speech recognizer 204 or translation model 250, which would thus obviate the need for a dedicated arrangement 205 for feature extraction.

Essentially, any of several commercially available speech recognizers would be suitable for use in conjunction with the embodiments of the present invention. Particularly favorable results have been observed in connection with speech recognizers produced by Dragon Systems, Inc. of Newton, Mass., and GTE Internetworking/BBN Technologies of Cambridge, Mass., but it is to be understood that, with the wide range of speech recognizers available on the market, there are bound to be several that work with similarly favorable results.

The methods carried out by the above-described arrangements can be used not only in audio indexing, but also in any application where noisy text data is processed, such as:

in indexing hand-writing recognition corpus, in indexing scanned (OCR processed) documents, and in indexing sources corrupted by typing errors, as is the case of many Internet sources.

In each case, the common objective, and operation for carrying it out, are essentially the same: to accept raw output from some type of language recognizer (be it written or spoken language) and/or feature extraction arrangement and to reconfigure the output in a manner that makes the data suitable for use in an indexing system. Thus, for instance, if an Internet web page, replete with typing errors, is used as an indexing source (such as for a browser or search engine), then a translation model in accordance with an embodiment of the present invention may reconfigure the error-laden input into corrected words that are then entered into the indexing database, thus considerably improving the effectiveness of a browser or search engine that may later access the database.

Experimental tests involving the above-described audio indexing techniques have been carried out in two audio indexing applications, namely, document segmentation and spoken document retrieval. In order to perform the experiments, a statistical machine translation system of the type described in J. S. McCarley and S. Roukos, "Fast Document Translation for Cross-language Information Retrieval (*Machine Translation and the Information Soup*, pp. 150–157, 1998) (D. Farwell, L. Gerber, E. Hovy, editors, Third Conference of the Association for Machine Translation in the Americas, 1998), and in copending U.S. patent application Ser. No. 09/123,166 (J. S. McCarley and S. Roukos, "A Statistical Translation System and Method for Fast Sense Disambiguation and Translation of Large Corpora", filed Jul. 27, 1998), was used. The training data were extracted from the TDT corpus (as described in J. Fiscus et al., "NIST's 1998 Topic Detection and Tracking Evaluation [TDT2]", DARPA Broadcast News Workshop Proceedings, March 1999) that includes news broadcasts from CNN, Voice of America, PRI (Public Radio International), and ABC News, which have been automatically transcribed by the Dragon and/or BBN speech recognizers, and which either have close-captioned or manually transcribed text from the FDCH (Federal Data Clearing House). For building the translation model, the source language was regarded as the output of the speech recognizer. The target language was regarded as the close-captioning/FDCH transcripts. The source and target languages were aligned at the level of sentences to form a parallel corpus.

The purpose of automatic document segmentation is to find document (story) boundaries in a stream of text, produced by a speech recognizer. The application of the translation model in the broadcast news segmentation task, described in Fiscus et al, supra, improved the performance of the system as measured by C_seg (cost of segmentation) from C_seg=0.1484 to C_seg=0.1446. A detailed description of the basic segmentation is contained in S. Dharanipragada et al., "Story Segmentation and Topic Detection in the Broadcast News Domain" (DARPA Broadcast News Workshop Proceedings, March 1999).

The spoken document retrieval task described in J. Garofolo, "Overview of the Spoken Document Retrieval Task" (Proceedings of the Eighth Text Retrieval Conference, November 1999), deals with retrieving information from the database of automatically transcribed news sources. The database used in this experiment consists of 21754 documents from four news sources. Using a translation model in this task improved the average precision from 0.4650 to 0.4678.

The disclosure now turns to a comparison of systems configured in accordance with at least one preferred embodiment of the invention with the system described in Allen et al., supra.

As discussed heretofore, Allen et al. describes the use of a statistically trained translation model in an air travel (ATIS) dialog/natural language understanding system. There, the statistical translation model was trained to translate from speech recognition output to hand-corrected (clean) text. The output of the translation model had fewer errors, and, it was claimed, thus led to better natural language understanding and better performance on the air travel task. However, systems configured in accordance with at least one presently preferred embodiment of the present invention differ from that of Allen et al. in several important aspects.

First, the primary goal of Allen et. al. was apparently to reduce the word-error-rate, and hence improve the readability of the speech recognizer output, whereas, in at least one embodiment of the present invention, the audio indexing effectiveness is directly improved, as measured through standard information retrieval metrics such as average precision. In Allen et al, in order to evaluate with respect to word-error-rate, a word-to-word translation model was built. In other words, singular and plural nouns were treated as different tokens by the translation model, as were the different tenses of verbs.

In contrast, a morph-to-morph translation model is contemplated in accordance with at least one embodiment of the present invention, which means that it treats singular and plural nouns as the same token, and the different tenses of verbs as the same token. This is advantageous because a typical audio indexing system will use morphological root words (and not verb tenses or noun declensions) as features in order to score documents. Thus, a morph-to-morph translation system is designed to correct the specific features of the documents that are normally important to information retrieval systems. As discussed heretofore, also broadly contemplated within the scope of at least one embodiment of the present invention is a stem-to-stem translation system and other systems in which words have undergone some intermediate step of feature extraction.

A morph-to-morph, stem-to-stem, or other type of translation system involving feature-extracted word data, on the other hand, would appear to be inappropriate for the goals in Allen et al. of improving word-error-rate or readability. In fact, a morphologically analyzed document or a document involving some other type of feature extraction, such as the output of a translation subsystem in accordance with the present invention, is essentially less "readable" than a document represented in words. It would also take considerable additional effort to undo the effects of the morphological analysis or other type of feature extraction so that word-error-rate could be measured.

The system described by Allen et al. was also focused on a limited domain, the ATIS air travel system. On the other hand, systems configured in accordance with at least one embodiment of the present invention can be applied to a broad domain (e.g., audio indexing of broadcast news), and a very wide range of possible alternative applications (e.g., Usenet/chatroom indexing, handwriting indexing, OCR indexing) broadens this domain further.

Morphological analysis, and other feature extraction techniques important for information retrieval, have the effect of reducing vocabulary size. Without reducing vocabulary size, translation models may be limited to narrow domains (such as air travel) both by limitation in computer memory and limitation in the resources required to collect training data for the statistical translation model.

The system of Allen et al. focused on correction of a noisy query to a clean air travel database. In contrast, at least one embodiment of the present invention takes the opposite approach by correcting the noisy documents. It has been noted that queries (or turns in dialog) are, at most, about a hundred words long, whereas large document collections may be millions of words long, or more. Furthermore, the types of errors that can occur in queries are limited by their length, whereas a speech recognition system operating on hundreds of hours of broadcast news may make errors "long-range temporal correlations", in other words, it may make similar errors in parts of the corpus separated by hours or days.

Finally, because the system described in Allen et al. focused on correction of queries (or dialog turns), it was forced to operate in real-time. As may be appreciated from the foregoing, a system configured in accordance with at least one embodiment of the present invention may be used either in real-time, as the documents are automatically transcribed, or the post-correction may be deferred until later time. The capability of deferring the translation phase may be particularly valuable, for instance, in correcting the "long-range temporally correlated errors."

It is to be understood that the present invention, in accordance with at least one presently preferred embodiment, includes a recognizer, a translator and an indexing database, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for providing clean data for indexing, said system comprising:
   a recognizer which recognizes words;
   an indexing database; and
   a translator, having been trained automatically, which accepts textual input, having originated from said recognizer, and which is adapted to automatically improve the quality of said textual input for entry into said indexing database, whereby errors produced by said recognizer and which are detrimental to indexing performance are reduced, and wherein, immediately prior to reconfiguration, said textual input appears as a feature-extracted transformation of at least one word recognized by said recognizer.

2. The system according to claim 1, further comprising a feature extractor which transforms words recognized by said recognizer into predetermined textual features and which provides the textual features as the textual input into said translator.

3. The system according to claim 2, wherein the textual features comprise morphs of words recognized by said recognizer.

4. The system according to claim 2, wherein the textual features comprise stems of words recognized by said recognizer.

5. The system according to claim 1, wherein said recognizer is adapted to transform recognized words into predetermined textual features and provide the textual features as the textual input into said translator.

6. The system according to claim 1, wherein said recognizer is adapted to provide the textual input into said translator and said translator is adapted to transform the textual input into predetermined textual features prior to reconfiguration of the textual input for entry into said indexing database.

7. The system according to claim 1, wherein:
   said recognizer is a speech recognizer for recognizing verbal audio input; and
   said indexing database is an audio indexing database.

8. The system according to claim 1, wherein said translator is trained on a corpus of automatically and by-hand transcribed data, the data originating from a domain substantially similar to that intended to be addressed by said recognizer.

9. The system according to claim 1, further comprising a temporary storage medium for storing the textual input for a period of time prior to its being accepted by said translator, so as to delay reconfiguration by said translator.

10. A method of providing clean data for indexing, said method comprising the steps of:
    providing an indexing database;
    providing a recognizer which recognizes words; and
    providing an automatically trained translator which accepts textual input having originated from said recognizer;
    said method further comprising the steps of:
    with said recognizer, recognizing words; and
    with said translator, accepting textual input having originated from said recognizer, and automatically improving the quality of said textual input for entry into said indexing database, whereby errors produced by said recognizer and which are detrimental to indexing performance are reduced, and wherein, immediately prior to reconfiguration, said textual input appears as a feature-extracted transformation of at least one word recognized by said recognizer.

11. The method according to claim 10, further comprising the steps of:
    providing a feature extractor; and
    with said feature extractor, transforming words recognized by said recognizer into predetermined textual features and providing the textual features as the textual input into said translator.

12. The method according to claim 11, wherein said step of transforming words into textual features comprises transforming words recognized by said recognizer into morphs.

13. The method according to claim 11, wherein said step of transforming words into textual features comprises transforming words recognized by said recognizer into stems.

14. The method according to claim 10, further comprising the step of:
    with said recognizer, transforming recognized words into predetermined textual features and providing the textual features as the textual input into said translator.

15. The method according to claim 10, further comprising the steps of:

with said recognizer, providing the textual input into said translator; and with said translator, transforming the textual input into predetermined textual features prior to said reconfiguring of the textual input for entry into said indexing database.

16. The method according to claim 10, wherein:

said step of providing a recognizer comprises providing a speech recognizer for recognizing verbal audio input; and said step of providing an indexing database comprises providing an audio indexing database.

17. The method according to claim 10, wherein said step of providing a translator comprises providing a translator that is trained on a corpus of automatically and by-hand transcribed data, the data originating from a domain substantially similar to that intended to be addressed by said recognizer.

18. The method according to claim 10, further comprising the steps of:

providing a temporary storage medium; and with said temporary storage medium, storing the textual input for a period of time prior to its being accepted by said translator, so as to delay said reconfiguring by said translator.

19. A program storage device readable by machine, tangibly embodying a program of instructions executable by the machine to perform method steps for providing clean data for indexing, said method comprising the steps of:

providing an indexing database;

providing a recognizer which recognizes words; and providing an automatically trained translator which accepts textual input having originated from said recognizer;

said method further comprising the steps of:

with said recognizer, recognizing words; and with said translator, accepting textual input having originated from said recognizer, and automatically improving the quality of said textual input for entry into said indexing database, whereby errors produced by said recognizer and which are detrimental to indexing performance are reduced, and wherein, immediately prior to reconfiguration, said textual input appears as a feature-extracted transformation of at least one word recognized by said recognizer.

* * * * *